United States Patent
Chang

(10) Patent No.: US 7,191,363 B2
(45) Date of Patent: Mar. 13, 2007

(54) METHOD FOR FACILITATING A TEST PERSON TO IDENTIFY A TEST PROGRAM ITEM IN SERVER TEST

(75) Inventor: Wen-Chang Chang, Taipei (TW)

(73) Assignee: Inventec Corporation, Taipei (TW)

( * ) Notice: Subject to any disclaimer, the term of this patent is extended or adjusted under 35 U.S.C. 154(b) by 608 days.

(21) Appl. No.: 10/648,334

(22) Filed: Aug. 27, 2003

(65) Prior Publication Data
US 2005/0049813 A1    Mar. 3, 2005

(51) Int. Cl.
*G06F 11/00* (2006.01)
(52) U.S. Cl. .......................................... 714/38; 717/125
(58) Field of Classification Search .................. 714/46, 714/38; 715/744, 740–742; 717/125
See application file for complete search history.

(56) References Cited

U.S. PATENT DOCUMENTS

| | | | |
|---|---|---|---|
| 6,304,982 B1 * | 10/2001 | Mongan et al. ............... | 714/38 |
| 6,360,268 B1 * | 3/2002 | Silva et al. .................. | 709/227 |
| 6,779,134 B1 * | 8/2004 | Laviolette et al. ............ | 714/38 |
| 6,810,494 B2 * | 10/2004 | Weinberg et al. ............. | 714/46 |
| 6,904,389 B2 * | 6/2005 | Hornberger et al. ........ | 702/188 |
| 7,039,912 B1 * | 5/2006 | Moulden et al. ............ | 718/100 |
| 2004/0044494 A1 * | 3/2004 | Muller et al. ............... | 702/123 |
| 2004/0075683 A1 * | 4/2004 | Savage ........................ | 345/741 |

* cited by examiner

*Primary Examiner*—Yolanda L Wilson
(74) *Attorney, Agent, or Firm*—Bacon & Thomas, PLLC

(57) ABSTRACT

The present invention is to provide a testing method comprising the steps of coupling a plurality of clients to a server for testing, providing a window by each client for selecting a test program, reading a window picture and a color from the memory and showing them to a position on the window corresponding to the selected test program name, causing the server to run the test program at the client and show a test finish signal sent from the server after finishing the running of the test program, and showing a window picture and a color of a next test program on a position on the window corresponding to the next test program name. Thus, the testing method facilitates a test person to identify the test program being tested in the server test by visually observing.

6 Claims, 5 Drawing Sheets

METHOD FOR FACILITATING A TEST PERSON TO IDENTIFY A TEST PROGRAM ITEM IN SERVER TEST

FIELD OF THE INVENTION

The present invention relates to a server testing method and more particularly to a method for facilitating a test person to identify a test program item while conducting a server test.

BACKGROUND OF THE INVENTION

A conventional method of testing server comprises connecting a great number of clients (i.e., computers) (e.g., 100 clients) to a server to be tested, and running a test program common to all clients for testing the server. Unfortunately, there are a plurality of test programs installed in each client. Thus, a test person has to watch carefully each test program selected sequentially by all clients in order to ensure that a test program common to all clients is selected by all clients in testing the server. However, human error is not avoidable since the selection is done manually. A correct test result is impossible to obtain if a test program inputted by one client (or test programs inputted by two clients) is (or are) erroneous. Moreover, an immediate next test program cannot be displayed on the client after finishing the previous one. In this regard, the test person must pay a great attention to the process of each test program in each client. Unfortunately, a number of unexpected conditions may occur. For example, a test person forgets the finished percentage of a test program after leaving temporarily (e.g., going to bathroom). Alternatively, a test person is not aware of the finished test program. As such, a timing selection of an immediate next test program is not performed. As an end, one or more important test programs are not tested due to carelessness. Unfortunately, the test person has to perform the whole testing procedure again if such carelessness does occur. This can bring a great inconvenience to the test person as well as consume precious time and labor. Hence, a need for improvement exists.

SUMMARY OF THE INVENTION

A primary object of the present invention is to provide a method for facilitating a test person to identify a test program item while conducting a server test comprising the steps of causing a test person to couple a plurality of clients to a server for testing the server, providing a window by each client for permitting the test person to select a test program to be tested, reading the test program and a window picture and a color thereof from the memory based on the selected test program on the window, showing the window picture and the color on a position on the window corresponding to the test program name, causing the server to run the test program at the client, causing the client to receive a test finish signal sent from the server after the server has finished the running of the test program, and showing a window picture and a color of a next test program on a position on the window corresponding to the next test program name. The present invention facilitates the test person to identify the test program item being tested in the server test by visually observing.

The above and other objects, features and advantages of the present invention will become apparent from the following detailed description taken with the accompanying drawings.

DETAILED DESCRIPTION OF THE PREFERRED EMBODIMENTS

The invention is directed to a method for facilitating a test person to identify a test program item in server test and enabling a test person of the server to flexibly establish a test program at client to be tested in order to overcome the prior drawbacks such as carelessness, time consuming, and labor consuming. The method of the invention comprises writing a plurality of basic databases into a memory of each of a plurality of clients in which each database comprises comparative data between test program names and test programs, and a window picture and a color of each test program, causing the test person to couple the clients to the server for testing the server, providing a window by each client for permitting the test person to select a test program to be tested, reading the test program and a window picture and a color thereof from each database in the memory based on the selected test program on the window, showing the window picture and the color on a position on the window corresponding to the test program name, causing the server to run the test program at the client, causing the client to receive a test finish signal sent from the server after the server has finished the running of the test program, and showing a window picture and a color of a next test program on a position on the window corresponding to the next test program name.

In the invention the client further comprises a basic database having comparative data between client names and a client IP (Internet protocol). When the test person couples the clients to the server for testing the server, each client will provide a window for permitting the test person to input a client name. Next, read a corresponding IP from the database in the memory based on the input client name. Next, show the IP on a corresponding position on the window. Finally, cause the server to run the test program at the client based on the IP.

Figure 2:
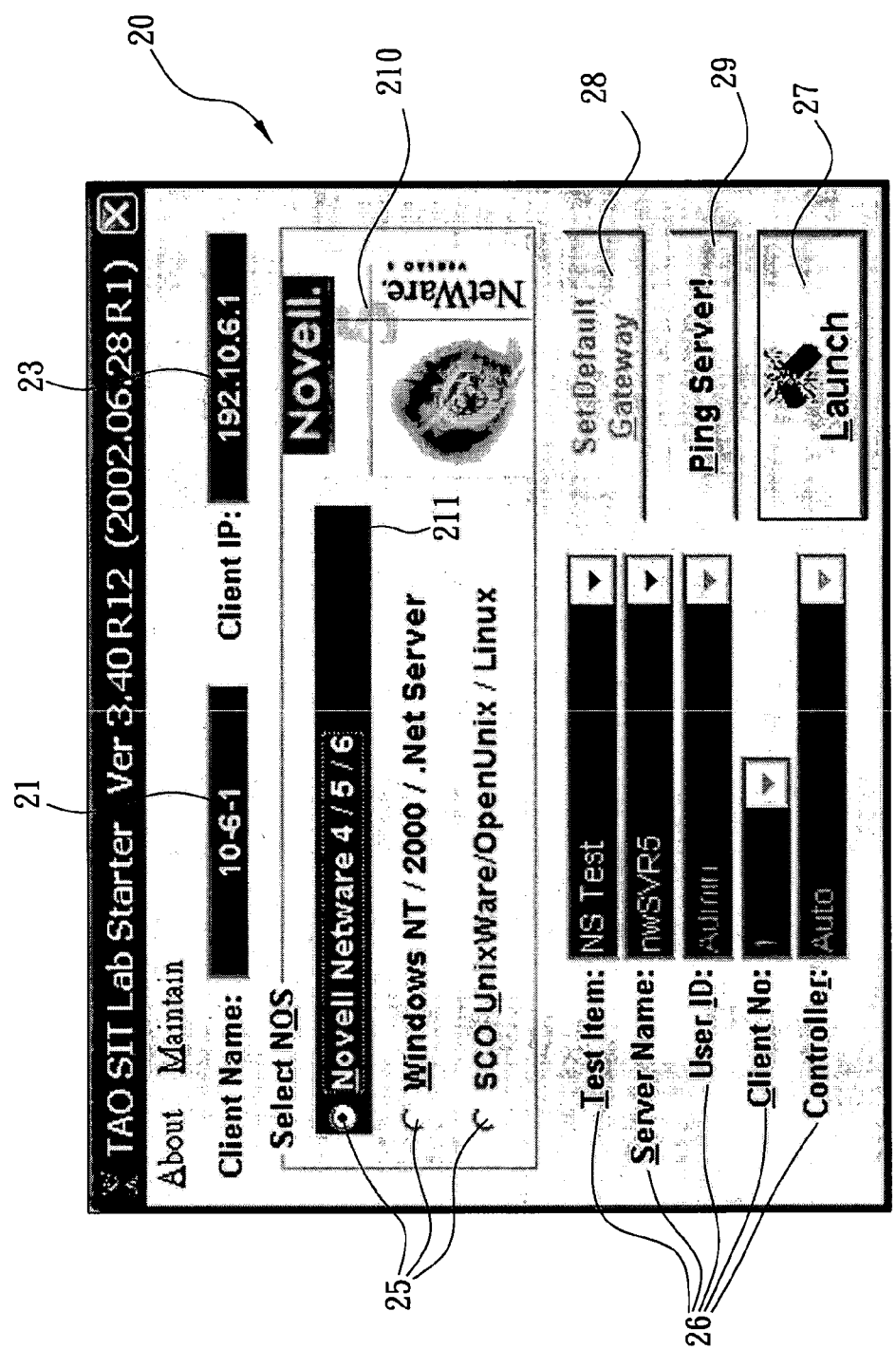
FIG. 2 shows a first window of a preferred embodiment of the invention.
Figure 3:
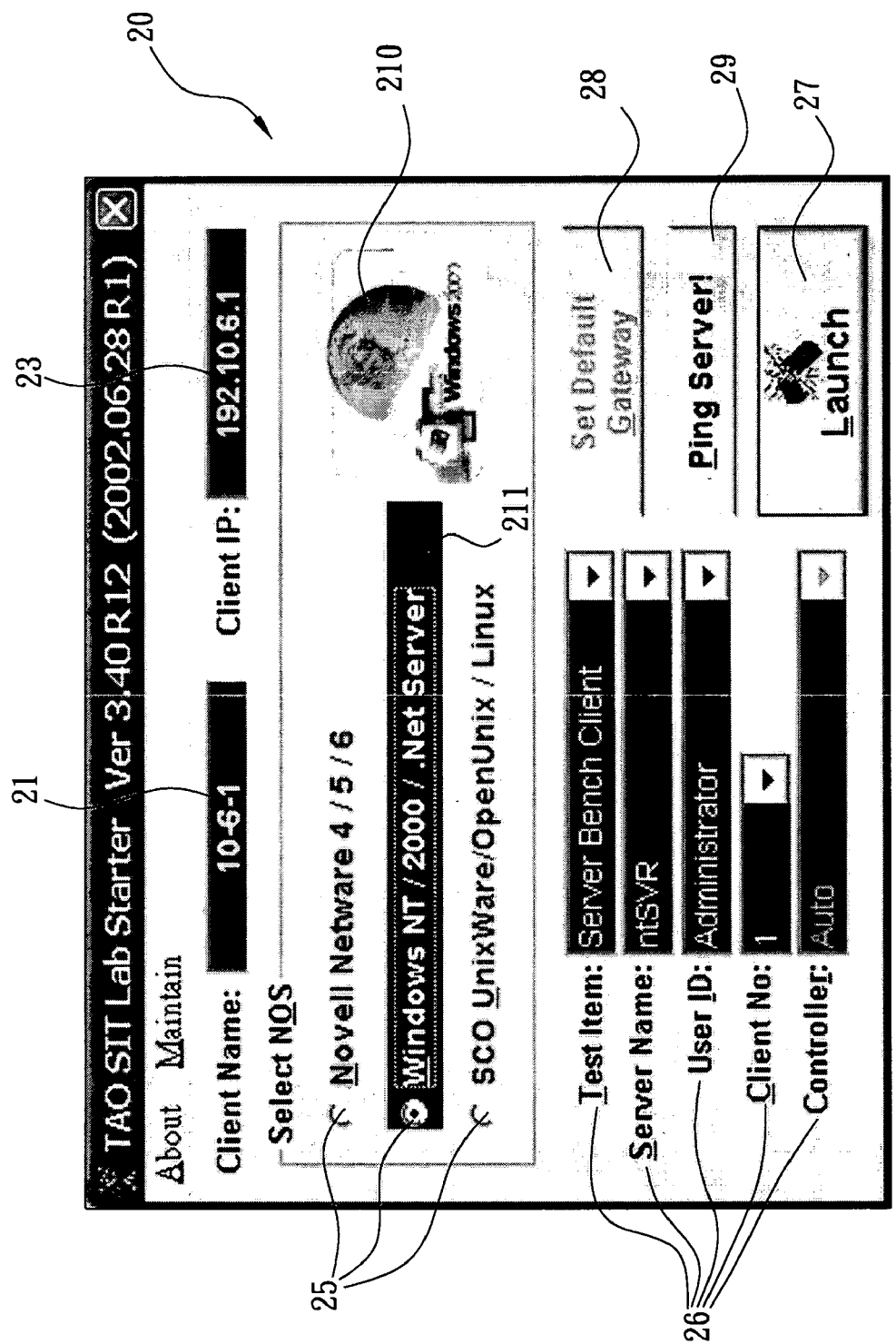
FIG. 3 shows a second window of the invention.
Figure 4:
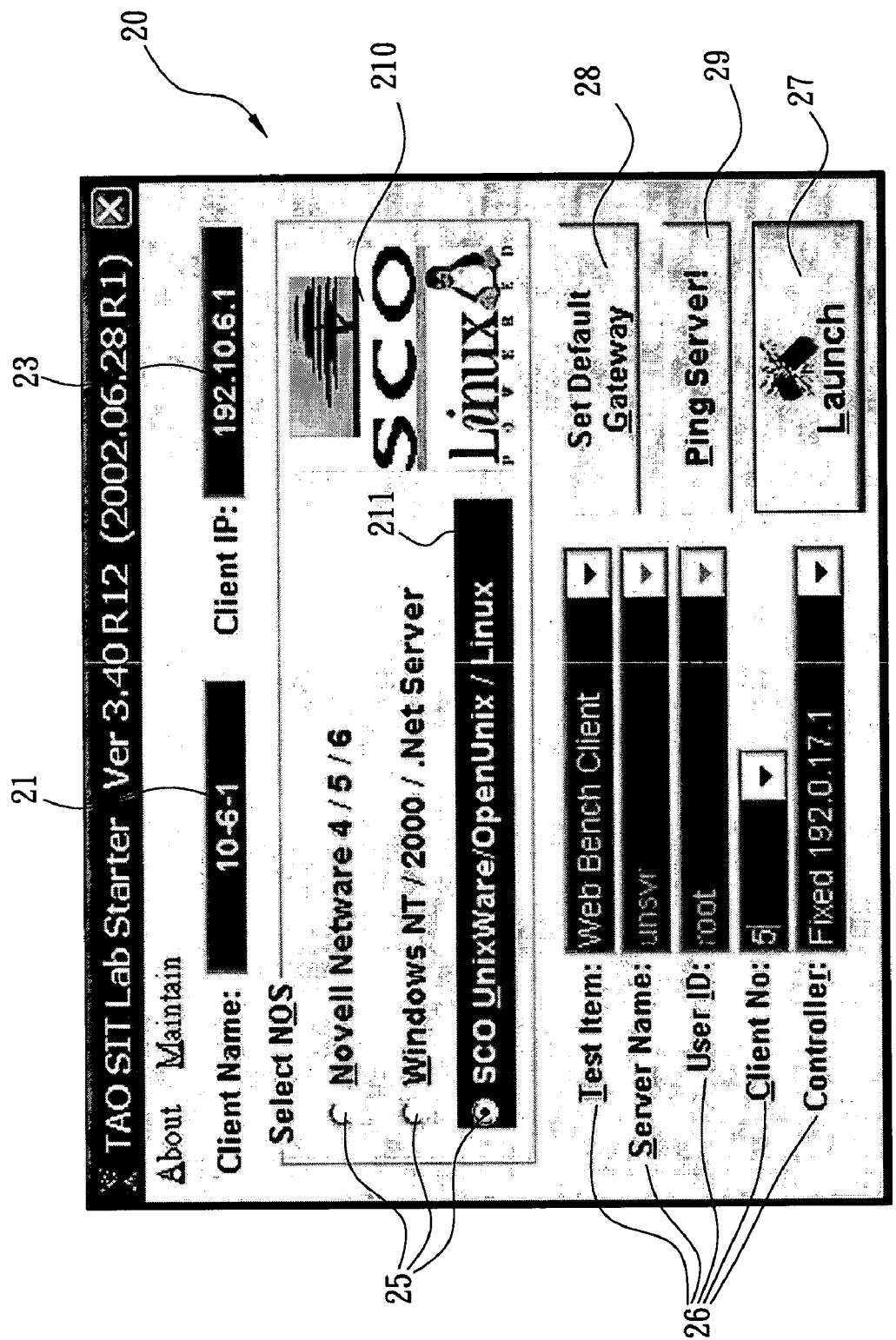
FIG. 4 shows a third window of the invention.

Referring to FIGS. 2, 3, and 4, there is shown a method in accordance with a preferred embodiment of the invention. The method first writes a plurality of basic databases and a window 20 into a memory of each of a plurality of clients in which each database comprises comparative data between client names and client IP, comparative data between test program names and test programs, and window picture and color of each test program. The window 20 comprises a client name field 21 for permitting a test person to input a client name, a client IP field 23, a test program dialog box (e.g., Select NOS) containing a plurality of (three) test program option buttons 25, a plurality of fields 26 of test items and techniques, a test launch button 27, a set default gateway button 28, and a ping server button 29 for detecting a remote computer.

When the test person couples the clients to the server for testing the server, each client will read a window 20 from its memory prior to showing the same on the display. The test person then inputs client names on the client name field 21 of the window 20 by means of an input device. The client will search a matched IP from comparative data between the client names in memory and the client IP based on input client name. The found IP will be written into a register prior to showing on the client IP field 23 of the window 20. Next, the test person use an input device to click one of three option buttons 25 (e.g., Novell Netware, Windows NT, and SCO UnixWare) regarding a test program item to be tested in the dialog box of the window 20. Next, the client searches a matched test program from comparative data between the test program names in memory and the test programs based on the selected test program item. The found test program will be written into a register. Next, read a corresponding color (e.g., red) 211 and a window picture 210 from the memory based on the selected test program item. Next, show the color 211 and the window picture 210 on the test program dialog box including test program option buttons 25 and one side of the test program dialog box respectively. As such, it is possible to give prominence to the selected test program item by means of the color 211 and the window picture 210. Hence, it will be easy for the test person to click a test item to be tested, a server name, a user ID, a client number, and a controller (e.g., automatic or manual) from the fields 26 of test items and techniques. Each client will receive the test finish signal sent from the server after the server has finished the running of the test program. Next, show a window picture 210 and a color (e.g., blue) 211 of a next test program on a position on the window 20 corresponding to the next test program in the test program dialog box 25 (see FIG. 3). As such, the test person may know the finished percentage of a test program.

Figure 1:
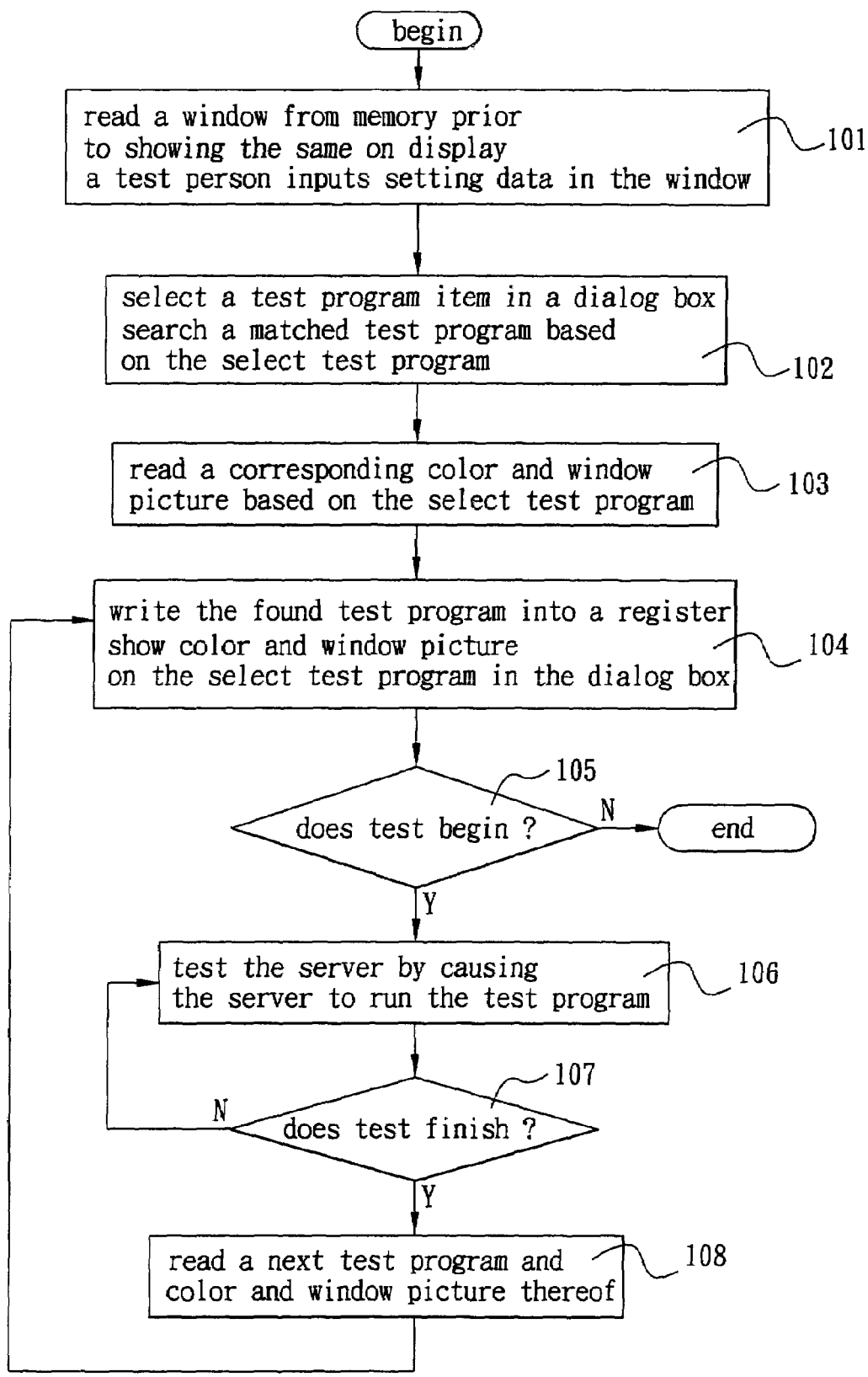
FIG. 1 is a flow chart of the invention.

Referring to FIG. 1 in conjunction with FIGS. 2 and 3, a flow chart according to a process of the invention is illustrated. Each client will perform the following steps for testing the server.

Step 101: Read a predetermined window 20 from the memory prior to showing the same on a display. The test person then inputs relevant setting data in the window 20 by means of an input device.

Step 102: Click one of three test program option buttons (e.g., Novell Netware, Windows NT, and SCO UnixWare) regarding a test program item to be tested in the test program dialog box containing test program option buttons 25. Next, search a matched test program from comparative data between the test program names in memory and the test programs based on the selected test program item.

Step 103: Read a corresponding color 211 and a window picture 210 from the memory based on the selected test program item.

Step 104: Write the found test program into a register. Next, show the color 211 and the window picture 210 on the test program dialog box containing test program option buttons 25 and one side of the test program dialog box respectively for ease of being visually identified.

Step 105: Determine whether the selected test program has begun or not, i.e., for determining whether test has begun. If yes, the process goes to step 106. Otherwise the process ends if a predetermined period of time has lapsed without clicking the test launch button 27.

Step 106: Test the server by causing the server to run the test program.

Step 107: Determine whether the test finish signal sent from the server has been received, i.e., for determining whether the test has finished. If yes, the process goes to step 108. Otherwise the process loops back to step 106.

Step 108: Read a next test program and color 211 and window picture 210 thereof prior to looping back to step 104.

As such, the test person may know a test program item being run by the server by observing the window picture 210 and the color shown on the window 20, thereby avoiding using an incorrect test program.

Figure 5:
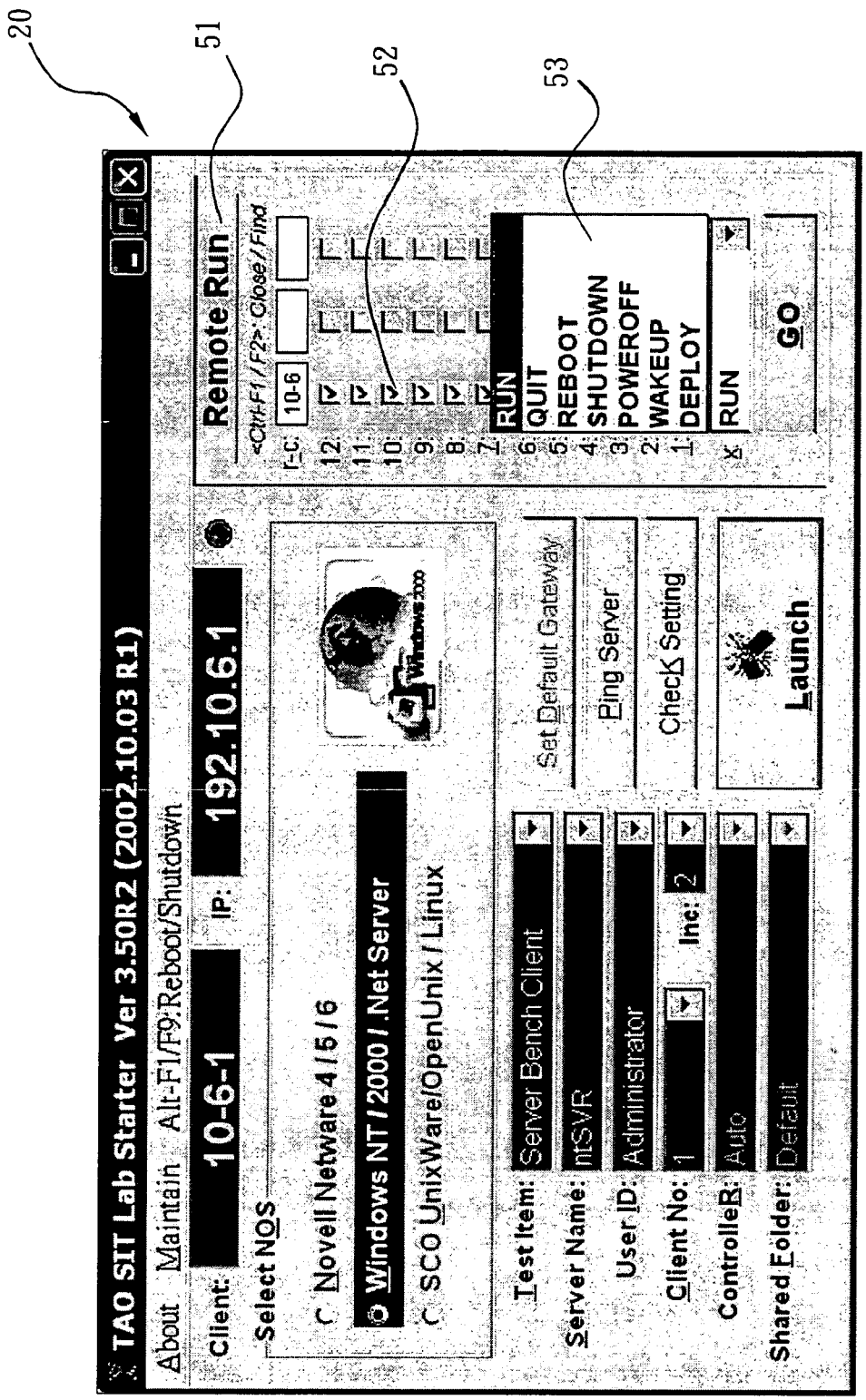
FIG. 5 shows a window of another preferred embodiment of the invention.

Referring to FIG. 5, there is shown another preferred embodiment of the invention. The window 20 of each client further comprises a remote run dialog box 51. As such, the test person may select one of a plurality of remote run option buttons 52 and one of a plurality of commands 53 contained in the remote run dialog box 51 by clicking by operating any client. As a result, the test person can operate any of other remote clients for causing the remote client to run the selected command 53 based on IP.

While the invention has been described by means of specific embodiments, numerous modifications and variations could be made thereto by those skilled in the art without departing from the scope and spirit of the invention set forth in the claims.

What is claimed is:

1. A method for facilitating a test person to identify a test program item in a server test, the method comprising writing a plurality of basic first databases into a memory of each of a plurality of clients, wherein each first database comprises comparative data between a plurality of test program names and a plurality of test programs, and a window picture and a color of each test program, causing the test person to couple the clients to a server for testing the server, and causing each client to perform steps of:

providing a window by each client for permitting the test person to select a test program to be tested;

reading the test program and a window picture and a color thereof from each first database in the memory based on the selected test program on the window;

showing the window picture and the color on a position on the window corresponding to the test program name;

causing the server to run the test program at the client;

causing the client to receive a test finish signal sent from the server after the server has finished the running of the test program;

reading a next test program and a window picture and a color thereof from each first database in the memory; and showing the window picture and the color of the next test program on a position on the window corresponding to the next test program name.

2. The method of claim 1, wherein the client further comprises a basic second database having comparative data between a plurality of client names and a client IP (Internet protocol) so that when the test person couples the clients to the server for testing the server, each client will provide a window for permitting the test person to input a client name, read a corresponding IP from the second database in the memory based on an input client name, show the IP on a corresponding position on the window, and cause the server to run the test program at the client based on the IP.

3. The method of claim 2, wherein the window comprises a client name field for permitting a test person to input a client name, a client IP field, a test program dialog box containing a plurality of test program option buttons, a plurality of fields of test items and techniques, a test launch button, a set default gateway button, and a ping server button for detecting a remote computer.

4. The method of claim 3, wherein in response to coupling the clients to the server for testing the server, each client searches comparative data between client names and the client IP in the memory based on an input client name for finding a matched IP, writes the matched IP into a register, and shows the matched IP on the client IP field of the window.

5. The method of claim 4, wherein in response to coupling the clients to the server for testing the server, each client searches comparative data between the test program names and the test programs in the memory based on a selected test program item for finding a matched test program item, writes the matched test program item into the register, reads a corresponding color and a window picture from the memory based on the selected test program item, and shows the corresponding color and the corresponding window picture on the test program dialog box and one side of the test program dialog box respectively to give prominence to the selected test program item by means of the corresponding color and the corresponding window picture.

6. The method of claim 5, wherein the window of each client further comprises a remote run dialog box including a plurality of remote run option buttons and a plurality of commands so that the test person can select one of the option buttons and one of the commands by clicking, and cause any remote client to run the selected command based on the IP.

* * * * *